United States Patent
Hughes et al.

(10) Patent No.: US 8,264,368 B2
(45) Date of Patent: Sep. 11, 2012

(54) RIFLE MOUNTED OPTICAL UNIT

(75) Inventors: Adam Hughes, Belfast (GB); Des Walker, Belfast (GB); Ian Maguire, Belfast (GB); David May, Belfast (GB)

(73) Assignee: Thales Holdings UK Plc, Addlestone Nr Weybridge (GB)

( * ) Notice: Subject to any disclaimer, the term of this patent is extended or adjusted under 35 U.S.C. 154(b) by 461 days.

(21) Appl. No.: 12/543,002

(22) Filed: Aug. 18, 2009

(65) Prior Publication Data

US 2010/0315256 A1   Dec. 16, 2010

(30) Foreign Application Priority Data

Jun. 12, 2009 (GB) .................................. 0910218.7

(51) Int. Cl.
G08B 5/22 (2006.01)

(52) U.S. Cl. .................. 340/815.45; 340/693.5; 42/132; 42/114

(58) Field of Classification Search ............... 340/815.4, 340/815.45, 693.5, 331; 42/132, 115, 111, 42/114, 103, 7, 50; 33/334; 362/259; 359/823
See application file for complete search history.

(56) References Cited

U.S. PATENT DOCUMENTS

| | | | |
|---|---|---|---|
| 4,339,177 A | 7/1982 | March | |
| 5,684,644 A | 11/1997 | Spears et al. | |
| 5,685,636 A | 11/1997 | German | |
| 5,842,300 A * | 12/1998 | Cheshelski et al. | 42/116 |
| 6,714,564 B1 | 3/2004 | Meyers | |
| 7,225,578 B2 * | 6/2007 | Tai | 42/132 |
| 2005/0116815 A1 | 6/2005 | Chen et al. | |
| 2007/0205890 A1 | 9/2007 | Brown | |
| 2008/0000133 A1 | 1/2008 | Solinsky et al. | |
| 2009/0207467 A1 | 8/2009 | Meyers et al. | |

FOREIGN PATENT DOCUMENTS

| | | |
|---|---|---|
| CN | 200989750 Y | 12/2007 |
| RU | 2 185 586 C1 | 12/2000 |
| WO | WO2006/023942 | 3/2006 |
| WO | WO 2007/002814 A2 | 1/2007 |

OTHER PUBLICATIONS

International Defense Review, vol. 21, Oct. 1988—"Eyes like a hawk . . . with Owl", Wallop Industries Ltd., Security Division, p. 1291.

* cited by examiner

*Primary Examiner* — Anh V La
(74) *Attorney, Agent, or Firm* — Oblon, Spivak, McClelland, Maier & Neustadt, L.L.P.

(57) ABSTRACT

A warning unit for attachment to a handheld firearm comprises an attachment device for attachment to a firearm, a light source, and a digitally manipulable input device operable to enable selection of a mode of operation. The warning unit is capable of being operated in at least a narrow divergence mode, and a wide divergence mode wherein, in the narrow divergence mode, the warning unit is operable to emit a beam of light of a lower divergence than in the wide divergence mode.

9 Claims, 4 Drawing Sheets

RIFLE MOUNTED OPTICAL UNIT

BACKGROUND OF THE INVENTION

1. Field of the Invention

The present invention is concerned with a device for projecting a beam of light in an intended direction. The device can be configured for attachment to a hand-held firearm, such as a rifle, or it can be mounted remotely and operated by, for example, a remote switch. The invention also envisages implementation by a stand-alone hand-held unit with an attached sight for aiming purposes.

2. Discussion of the Background

It is known to include, or to provide for, a light emitting device for use by a user of a firearm. A device of this nature can be fitted to a firearm to allow an optical laser beam to be directed from the weapon in a desired direction. Preferably, such a device is fitted, rather in the form of a bayonet, parallel with a barrel of such a weapon, such that the beam emitted therefrom is (disregarding considerations of parallax) substantially coincident with the firing beam of the weapon.

Such a device can be used for two purposes. Firstly, the device might be used to illuminate a region within which a target may be located. In that way, visual appraisal can be made of a situation before potential use of the firearm.

Secondly, an illuminating device might be used to trace a target, for use by a guided munition. This use often relies upon emission of an intense laser beam, low in divergence, to ensure accuracy.

There is concern amongst various sources of regulation of such technology that devices more suitable for use in the latter are actually being deployed for the former use. That means that highly intense laser beams are being used for illumination. This can be dangerous for a human on which such a laser beam impinges, and has the potential to cause permanent eye and/or skin damage. There is a concern that such devices, used deliberately, might in fact be contrary to the laws of war, particularly the Protocol on Blinding Laser Weapons.

There is no desire to contravene such conventions by the provision of new products. Therefore, there is a desire to provide a device which aims to provide the advantageous functions of existing technologies, while avoiding classification thereof as a blinding laser weapon.

Moreover, existing technologies have only been able to operate over a narrow temperature band, due to limitations in laser technology. In military applications it is desirable for a device to be capable of being used in a wide range of environmental conditions.

Other devices exist which provide a user with an output beam of variable divergence. However, such devices generally provide unwieldy controls and require manual intervention from a user, thus removing at least one hand from the weapon on which the device is deployed, in use. This is disadvantageous as the resultant device might distract the user, and would therefore detract from effective use of the weapon to which the device is fitted.

SUMMARY OF THE INVENTION

An aspect of the invention provides a warning unit for attachment to a handheld firearm, the warning unit comprising attachment means for attachment to a firearm, a light source, and digitally manipulable input means operable to enable selection of a mode of operation, the warning unit being capable of being operated in at least a narrow divergence mode, and a wide divergence mode wherein, in the narrow divergence mode, the warning unit is operable to emit a beam of light of a lower divergence than in the wide divergence mode.

In one embodiment, the light source may be a laser light source. The laser light source may be a laser diode.

The light source may be operable to emit a beam of light which is substantially green in the visible spectrum.

The digitally manipulable input means may comprise at least one push button. The digitally manipulable input means may comprise first and second push buttons, for respective modes of operation of the warning unit.

The warning unit may include a digitally manipulable input means which, when actuated by a user, causes said warning unit to impose a time varying envelope on a beam of light emitted in operation in any of said modes of operation. The time varying envelope comprises a square wave, thereby causing said beam of light to pulse.

The warning unit may include intensity control means operable in said wide divergence mode to cause said beam of light to be of lower intensity than in said narrow divergence mode.

BRIEF DESCRIPTION OF THE DRAWINGS

A specific embodiment of the invention will now be described with reference to the accompanying drawings, in which.

DETAILED DESCRIPTION OF THE PREFERRED EMBODIMENTS

Figure 1:
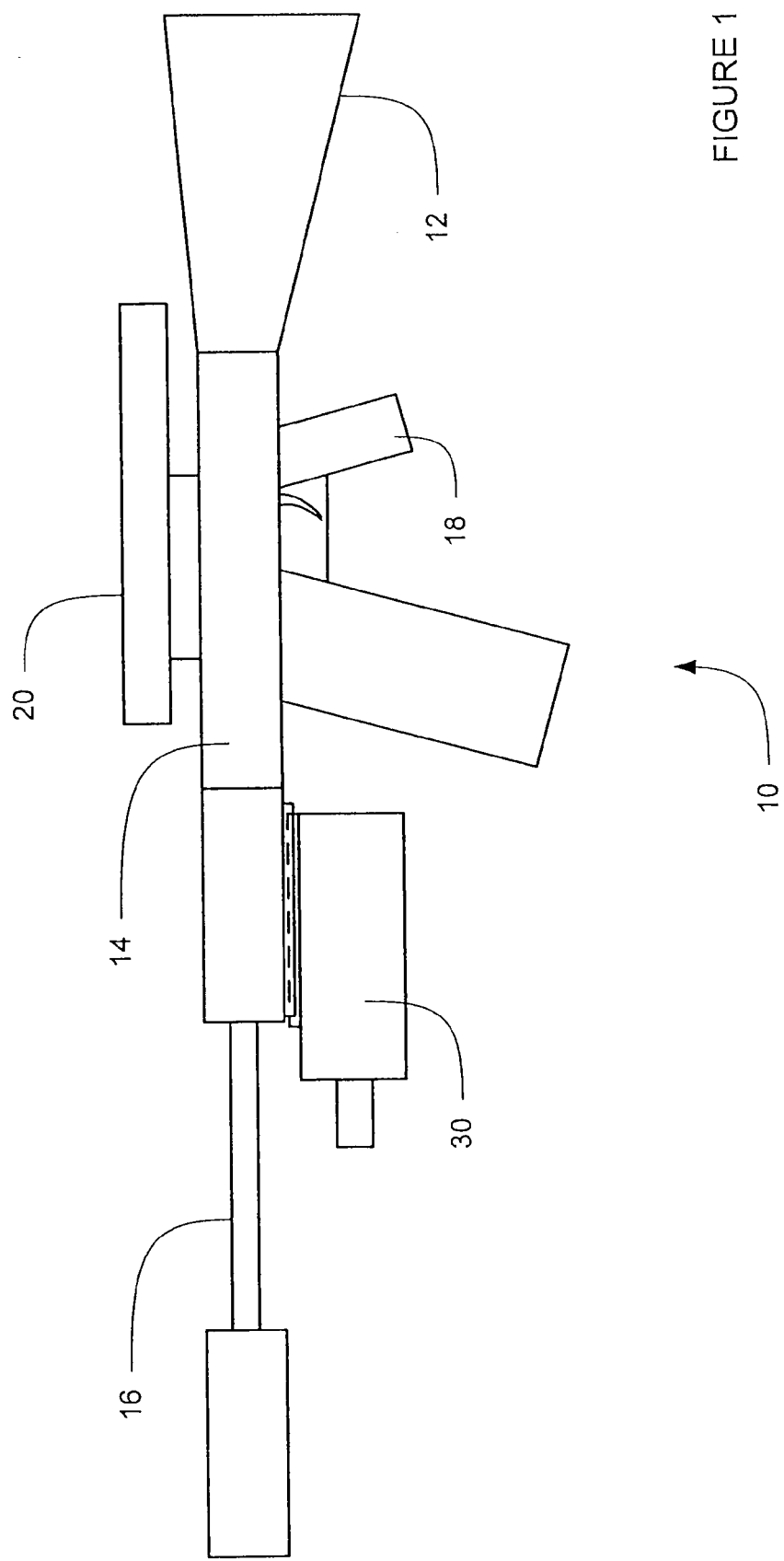
FIG. 1 illustrates a side elevation of a firearm to which an optical warner in accordance with the specific embodiment of the invention is attached.

As illustrated in FIG. 1, a handheld rifle 10 of generally known construction is illustrated. For clarity, elements thereof have been indicated, namely a shoulder stock 12, a breach block 14, a barrel 16 and a pistol grip 18. A telescopic sight 20 is attached to the breach block 14 by way of a sliding interlocking engagement of known type.

An optical warner 30 is also suspended from the forward part of the bridge block 14, by use of a MIL-STD 1913 Picatinny rail system. Along with this, a mechanical alignment mechanism, such as would be provided for a sight for a rifle, allows for accurate positioning of illumination while the warner is attached to the rifle.

Figure 2:
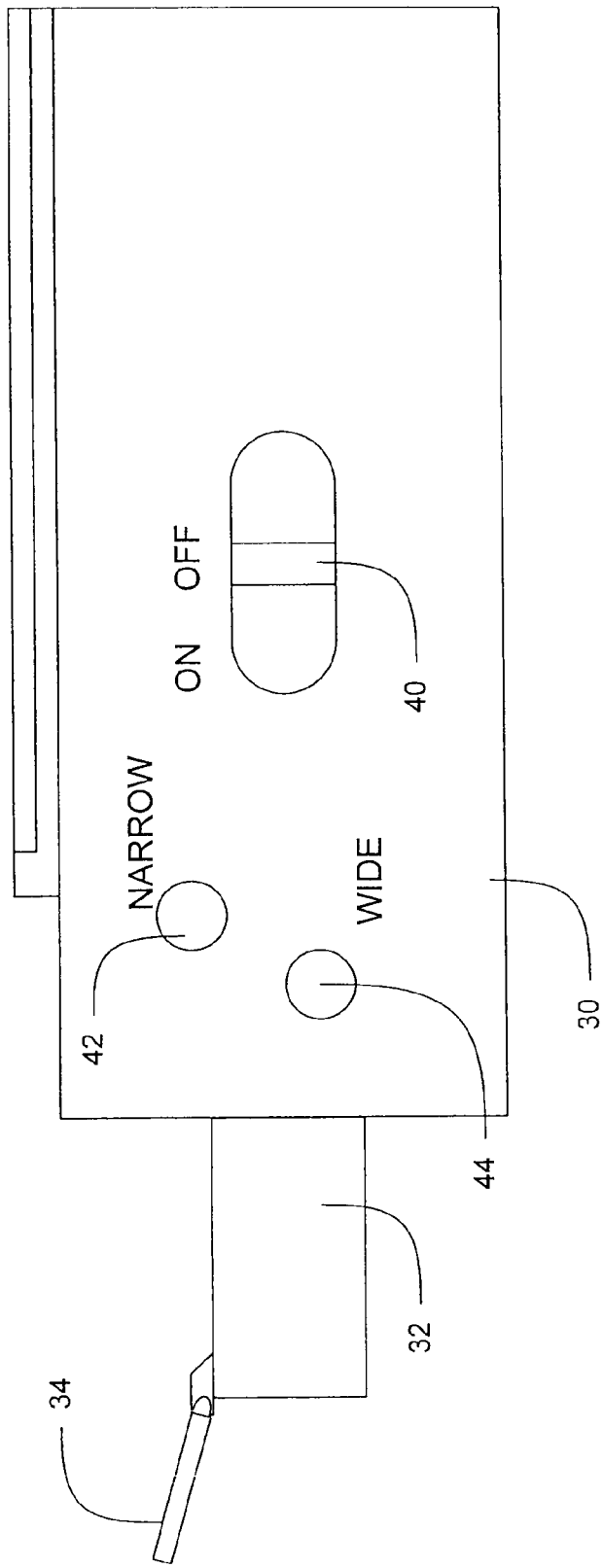
FIG. 2 illustrates a side elevation, in further detail, of the optical warner illustrated in FIG. 1.

As illustrated in FIG. 2, the optical warner 30 comprises a generally cuboidal casing, from one end of which protrudes a cylindrical lens housing 32. A lens cap 34 is hingeably attached to the lens housing 32. The lens cap is hingeable about an axis which is substantially tangential of both the lens housing 32 and the lens cap 34 and, as illustrated, level with the horizontal and uppermost as the firearm is in its conventional position. The hinge of the lens cap 34 on the lens housing 32 contains a tension spring to ensure that the cap stays open. In such circumstances, closing is via a snap fit.

A hand actuated snap action maintained contact (rocker type) switch 40 is illustrated, which is digitally manipulable between forward and backward extremes. Throwing the switch 40 into the forward position constitutes placing the optical warner 30 in an "on" condition. Conversely, in a backward position, the switch indicates that the optical warner 30 is in an "off" position. The on/off switch is, in the present embodiment, positioned so as to avoid accidental switching of the on/off state during carrying fo a firearm fitted with the warner.

Forward of the on/off switch 40 are two hand actuated momentary switches 42, 44. The upper switch 42, labelled WIDE in FIG. 2 is manually depressible by a user to place the temperature stabilised warner in a wide divergence mode. Conversely, a narrow beam switch 44, when depressed, places the optical warner in a narrow beam mode.

Figure 3:
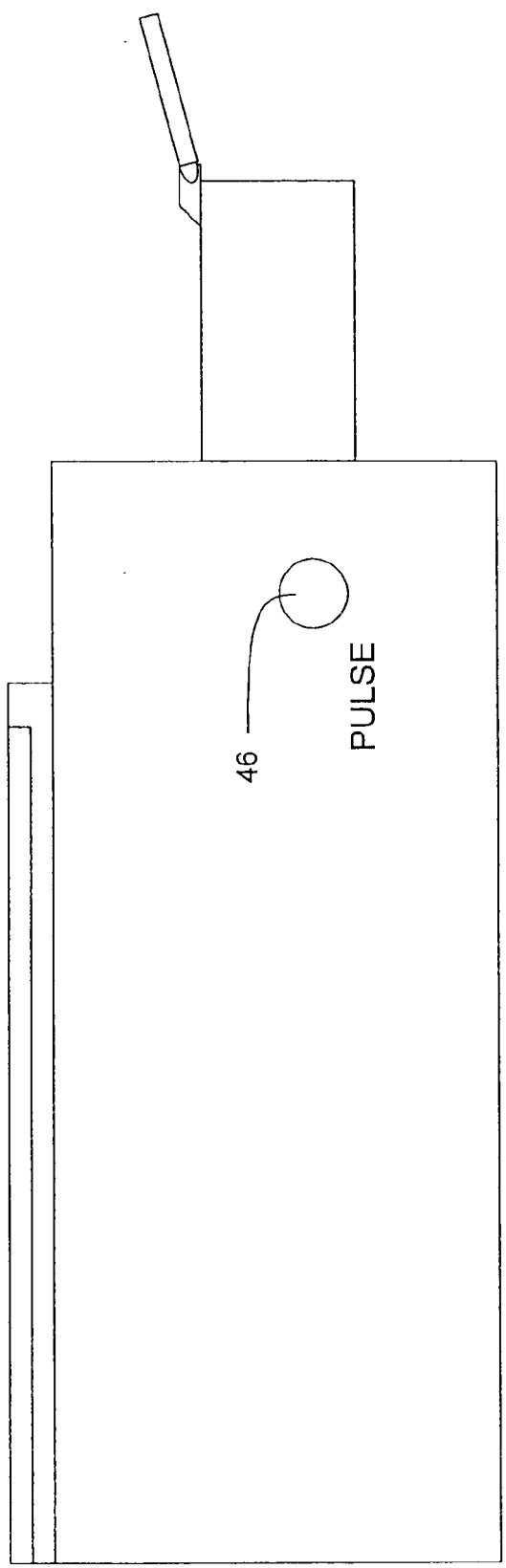
FIG. 3 illustrates an opposite side elevation of the optical warner illustrated in FIGS. 1 and 2.

As indicated in FIG. 3, a pulse button 46 is provided on the opposite side of the optical warner 30.

Figure 4:
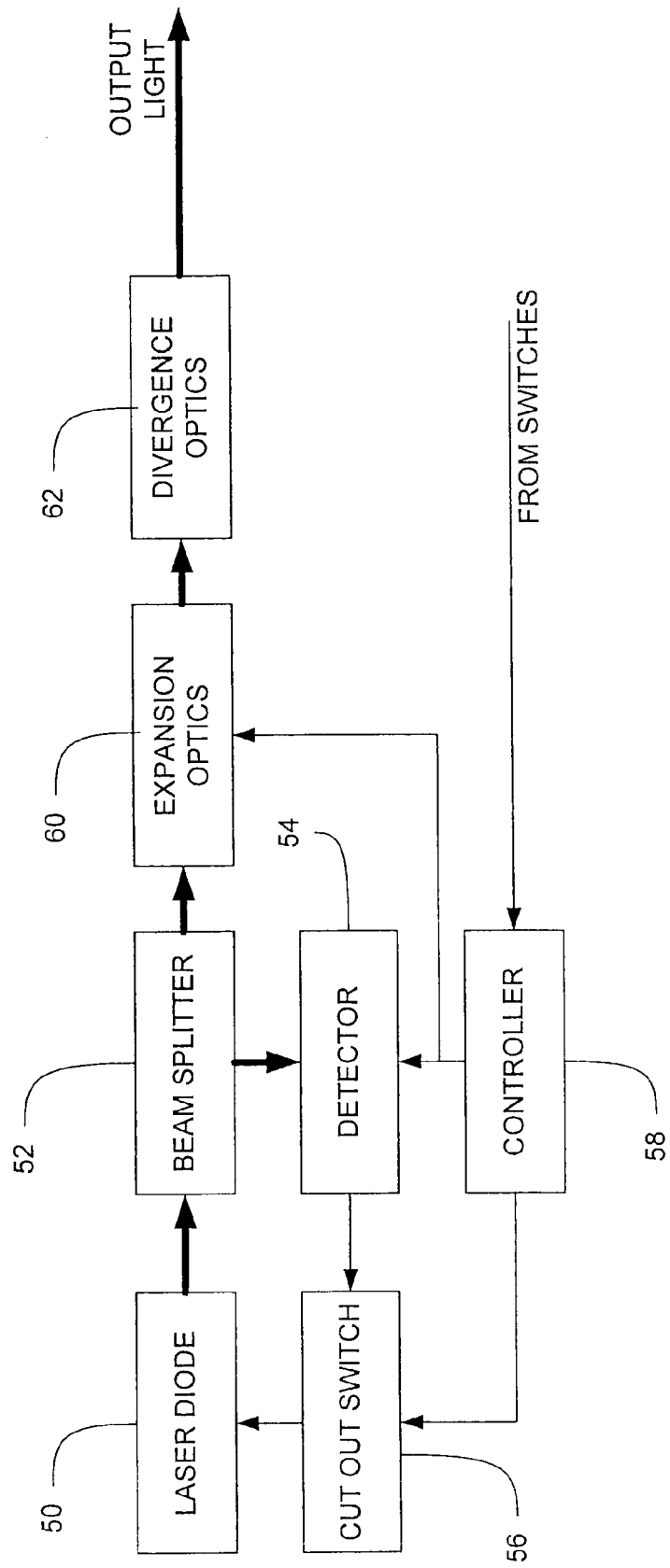
FIG. 4 illustrates a schematic diagram of optical and electronic elements of the optical warner.

The internal components of the optical warner will now be described with reference to FIG. 4. A laser diode 50 is at the head of an optical chain indicated by heavy lines in FIG. 4. In this embodiment, the laser diode is a diode pumped solid state laser (DPSS), though other configurations would also be possible. This is under the control of electronic signals, indicated by lighter lines.

The laser diode 50 is temperature stabilised, for example by a Peltier cooler and a thermoelectric controller. Temperature stability allows the laser diode to maintain a substantially constant output of light across a wide ambient temperature range.

The laser diode is, in this embodiment, configured to emit green light in the visible spectrum, as it has been shown that the human eye is the most responsive to light of this colour.

Light emitted by the laser diode 50 passes to a beam splitter 52. The beam splitter splits the beam unequally. The majority of the light passes through the beam splitter towards expansion optics 60 and then to divergence optics 62. Once modified by the expansion optics 60 and the divergence optics 62, the resultant beam is output from the lens housing 32.

A small part of the light incident on the beam splitter 52 is passed therefrom to a detector 54. The detector is implemented by way of a light sensitive diode, which detects the intensity of light incident thereon exceeds a given value. If this is the case, then a switching signal passes to a cut-out switch 56. The cut out switch 56 prevents operation of the laser diode 50 until such time as operating conditions have restored to acceptable levels. The reasons for excessive light generation could include abnormal temperature stability of the laser diode 50 or a component failure.

A controller 58 receives signals from the switches previously described. The controller manages reset of the detector 54 and the cut-out switch 56, in the event of a cut-out. Reset could involve throwing the on/off switch 40 from the "on" position, to the "off" position, and then back to the "on" position. In particular, in the present embodiment, the unit power to the laser diode is disabled until the laser output power is below a maximum specification. This minimises the risk of laser output being above generally accepted safety criteria.

In addition, the controller manages the extent to which the expansion optics expand the beam of light incident thereon, thereby reducing the intensity of light, and the extent to which the diversions optics impose a divergence on the beam of light. The controller has two modes.

In a first, "wide" mode, the expansion optics expand the beam sufficiently to ensure coverage of a potential threat at close range thus overcoming any parallax offset, at an intensity which will cause little or no distress to an observer. This may be up to seven times the MPE (maximum permissible exposure) at the aperture but this results in less than one hundredth of the MPE at the expected target distance. The 'safe' target distance is 6 meters in such circumstances, but this is an approximate figure. This might not be considered dangerous, but probably cannot be guaranteed to be entirely safe. This complies with most military applications of such a device. It would be undesirable for a device to be deployed which it were known would cause long term or permanent damage to the eyes of a third party.

In that first (or wide) mode, the divergence optics 62 are also set by the controller to a relatively wide divergence. In one example, divergence can be sufficiently wide that a beam forms a spot up to three or four meters across at one hundred meters from the optical warner.

In a narrow mode, as indicated by the switches, the controller sends signals to the expansion optics 60, to alter the respective optical functions thereof. The expansion optics reduces the extent to which the incident beam is expanded. Furthermore, the divergence optics 62 reduces the angle of divergence. The intention is that a beam, in the narrow mode, will develop a spot 75 cm across at 100 m. This can be of relatively intense light which has a hazard distance which is calculated in accordance with BS EN 60825-1, and is intended to provide a warning to an observer.

Similarly, a signal from the pulse button 46 will result in the controller 58 imposing a pulsed envelope over the activation signal to the laser diode 50, leading to a pulsed beam of light. It will be understood that the frequency of the pulse signal will be selected to avoid the possibility of invoking an epileptic attack or the like. The use of a pulsed output is valuable, as such a light output is more likely to attract the attention of an observer than an unvarying beam of light.

As will be understood from the above, the device provides a simple hand held facility to a user, to allow a beam of light to be emitted in one of two modes, with optional superposition of a pulsed envelope.

The reader will appreciate that the warner as described generates a beam of light which has inherent safety characteristics, as it does not rely on the divergence of a point light source, but rather develops a divergent beam with safety monitoring.

In a first mode, the optical warner can be used as a torch, and at relatively low intensity. In such conditions, the possibility of detection of the user of the torch could be reduced than if a high intensity light source were used. Moreover, by positioning the device on the forward part of the firearm, for one-handed operation by a user, the user can keep hands placed on his firearm and thus be in a state of readiness commensurate with a combat situation. Therefore, the element of unpreparedness which might arise from use of a hand held torch would be reduced.

In addition, in the wide and/or narrow mode, depending on the range, the user is able to coordinate use of the firearm as an emitter of a warning beam of light, with the more conventional use of the firearm. As configured, there is no need for the user to remove his right hand from the pistol grip of the firearm, while interrogating a third party with the use of the warning beam of light. The buttons on the optical warner are positioned so as to allow use by the user by the opposite hand than that employed for operation of the trigger at the pistol grip thereof.

A difference between the presently described embodiment and a high-intensity torch of known type, is that a laser output can provide a higher level of beam intensity (without breaching safety criteria) for much longer distances. This increased range increases the level of safety for the operator. A relatively high intensity beam should be sufficient to deter an innocent bystander from approaching on foot or in a vehicle, and will allow a suitably trained operator to control the situation with a reduced likelihood that the operator will have to resort to (potentially lethal) force. Of course, an aggressor, particularly one with limited concern for his welfare (e.g. a suicide bomber) could forcibly attempt to advance despite the deployment of such a beam of light and, in such cases, the operator would have to respond. As the laser so provided can have a much longer range than a torch light of a similar power, the operator would have an increased distance over which to act against the aggressor.

Although not illustrated, it may be convenient, in another embodiment of the invention, to provide a display means, such as an indicator display, capable of presenting information to a user. Such information may include when the laser is warming up, low battery status, when the laser is operating, when the laser is pulsing, and when the laser output power is low.

Also not illustrated, but omitted only for reasons of clarity, is the presence of a power supply. It will be appreciated that a power supply will be necessary for the present embodiment of the invention, but that simple batteries such as type AA batteries will be suitable.

While not illustrated, the reader will appreciate that the control circuitry will allow the unit to be connected, via an available connection, to a remote control device. This will enable the device to be used in situations such as when the operator is in a vehicle, or at a roadside—the warner can be attached then remotely of the firearm.

In an embodiment of the invention, a processing device, such as an FPGA, can be incorporated into a warner, along with a location device such as a GPS receiver module. Using such facilities, the warner would be able to determine and retain records of time, duration and location of use of the warner, for later retrieval and analysis. Such could be useful in the event of an allegation of misuse of the warner.

Whereas, as illustrated in FIG. 1, a warner unit is shown as a single unit attached at a foregrip position of a rifle, another embodiment makes use of a vertical foregrip of a known type which incorporates switches and batteries equivalent to those described; the optical train is then housed in a tubular structure on the side of the weapon. This allows greater flexibility on the range of weapons that can be used. Also, ergonomically it is can be desirable to an operator when wearing body armour, as a vertical foregrip may be easier to hold.

Whereas specific details have been given above of one embodiment of the invention, no part thereof is intended to limit the scope of protection afforded by the present disclosure. Instead, the scope of protection sought should be determined from the claims, appended hereto, in the light of the description and with reference as appropriate to the accompanying drawings.

The invention claimed is:

1. A warning unit for attachment to a handheld firearm, the warning unit comprising:
   attachment means for attachment to a firearm,
   a light source,
   expansion optics for expanding a beam of light emitted by the light source,
   divergence optics for controlling an amount of divergence of the beam emitted by the light source,
   a controller for controlling the extent to which the expansion optics expand the beam of light and for controlling the extent to which the divergence optics impose a divergence on the beam of light,
   input means actuatable by a user's hand to enable selection of a mode of operation of the warning unit, the warning unit being capable of being operated in at least a narrow divergence mode, and a wide divergence mode,
   wherein,
   in the narrow divergence mode, the controller is operable to cause the expansion optics to reduce the extent to which the beam is expanded and to cause the divergence optics to reduce the extent to which the beam of light diverges, to thereby cause the warning unit to emit a beam of light of a lower divergence than in the wide divergence mode.

2. A warning unit in accordance with claim 1 wherein the light source is a laser light source.

3. A warning unit in accordance with claim 2 wherein the laser light source is a laser diode.

4. A warning unit in accordance with claim 1 wherein said light source is operable to emit a beam of light which is substantially green in the visible spectrum.

5. A warning unit in accordance with claim 1, wherein said input means comprises at least one push button.

6. A warning unit in accordance with claim 5 wherein said input means comprises first and second push buttons, for respective modes of operation of the warning unit.

7. A warning unit in accordance with claim 1 and including a second input means which, when actuated by a user's hand, causes said warning unit to impose a time varying envelope on a beam of light emitted in operation in any of said modes of operation.

8. A warning unit in accordance with claim 7 wherein said time varying envelope comprises a square wave, thereby causing said beam of light to pulse.

9. A warning unit in accordance with claim 1 and including intensity control means operable in a torch mode to cause said beam of light to be of lower intensity than in said warning mode.

* * * * *